Nov. 16, 1937.  I. A. WEAVER  2,099,636
VEHICLE LIFT
Filed Dec. 9, 1935  5 Sheets-Sheet 5
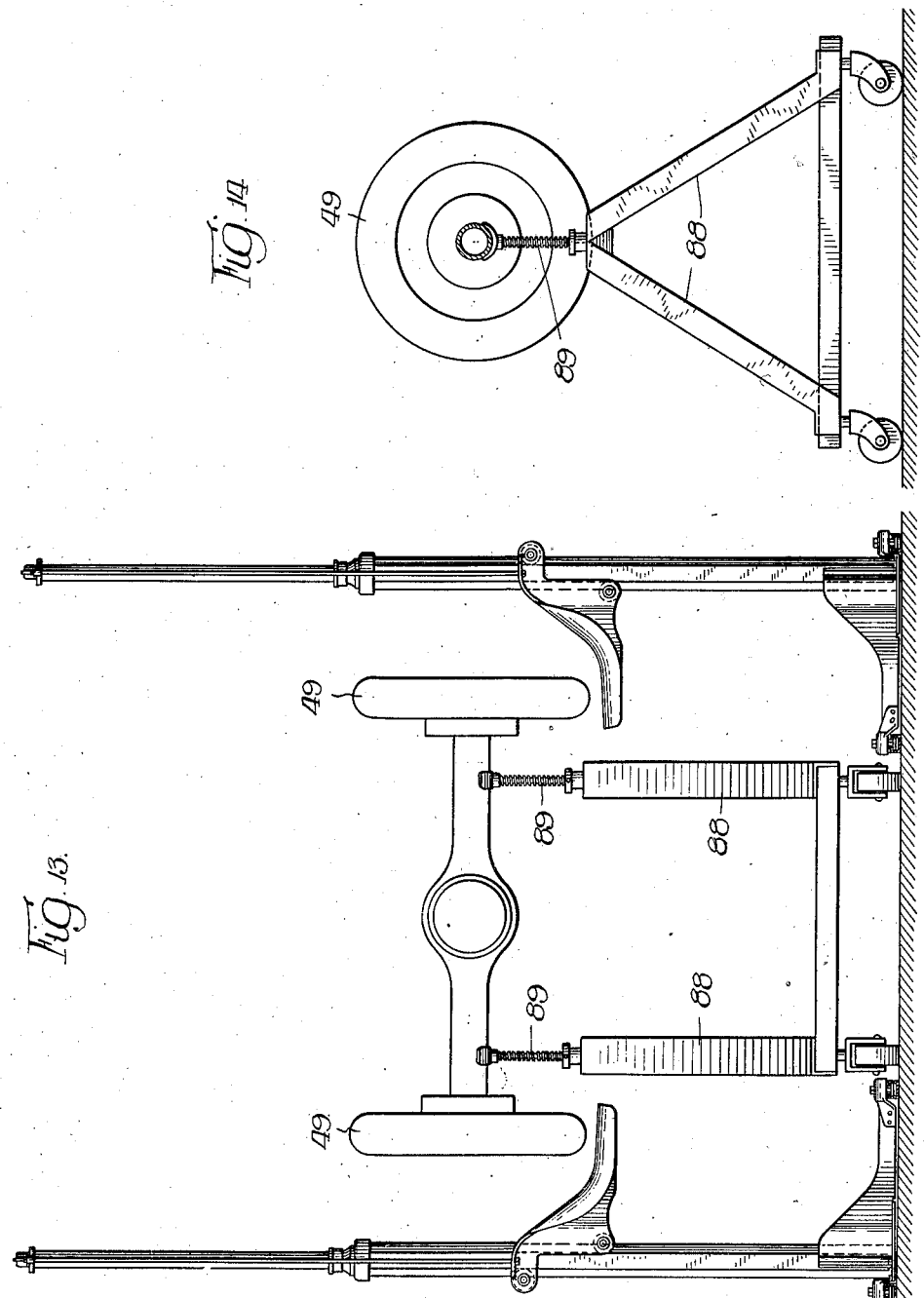
Inventor:
Ira A. Weaver,
By Walter M. Fuller
Atty Patented Nov. 16, 1937

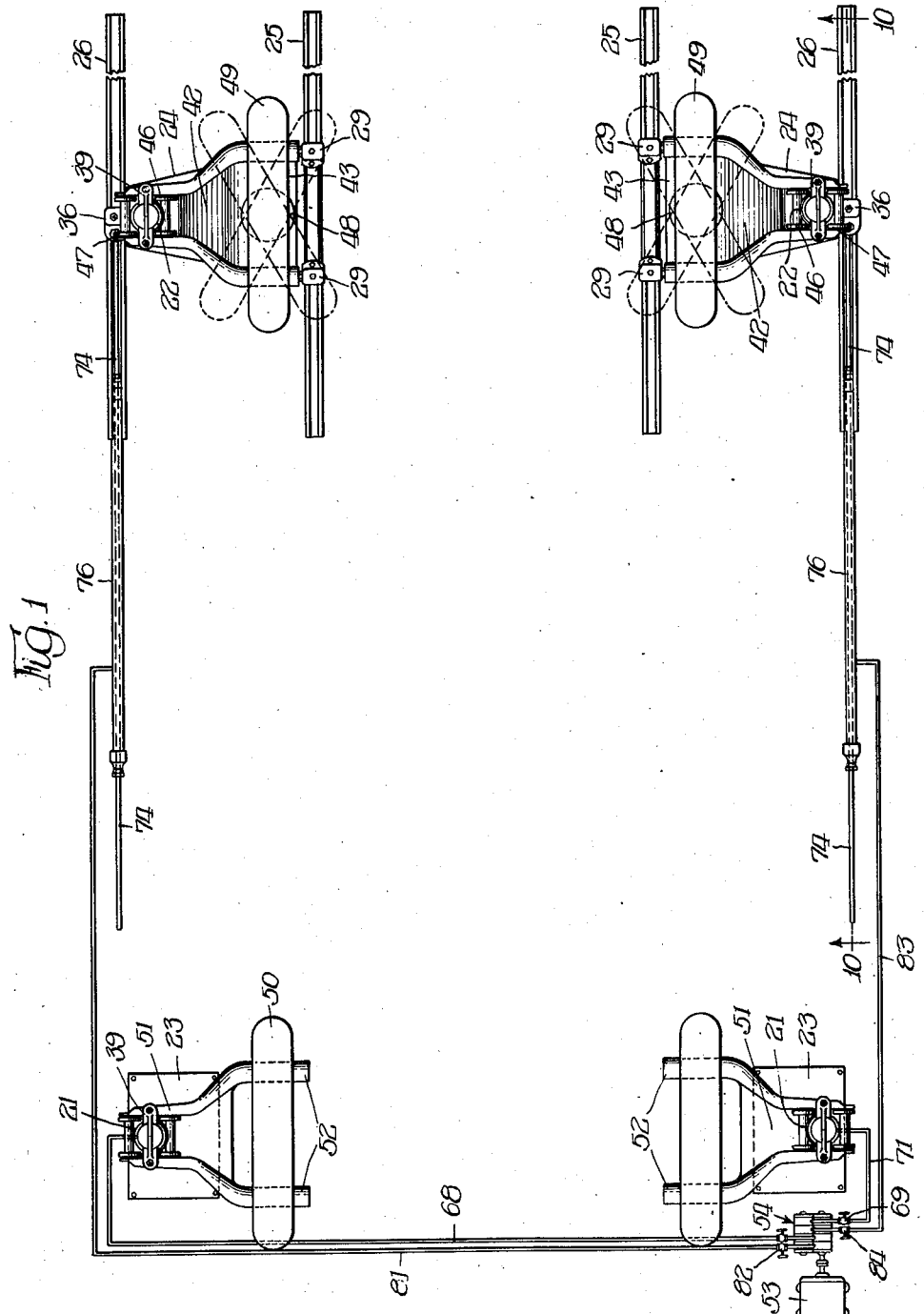

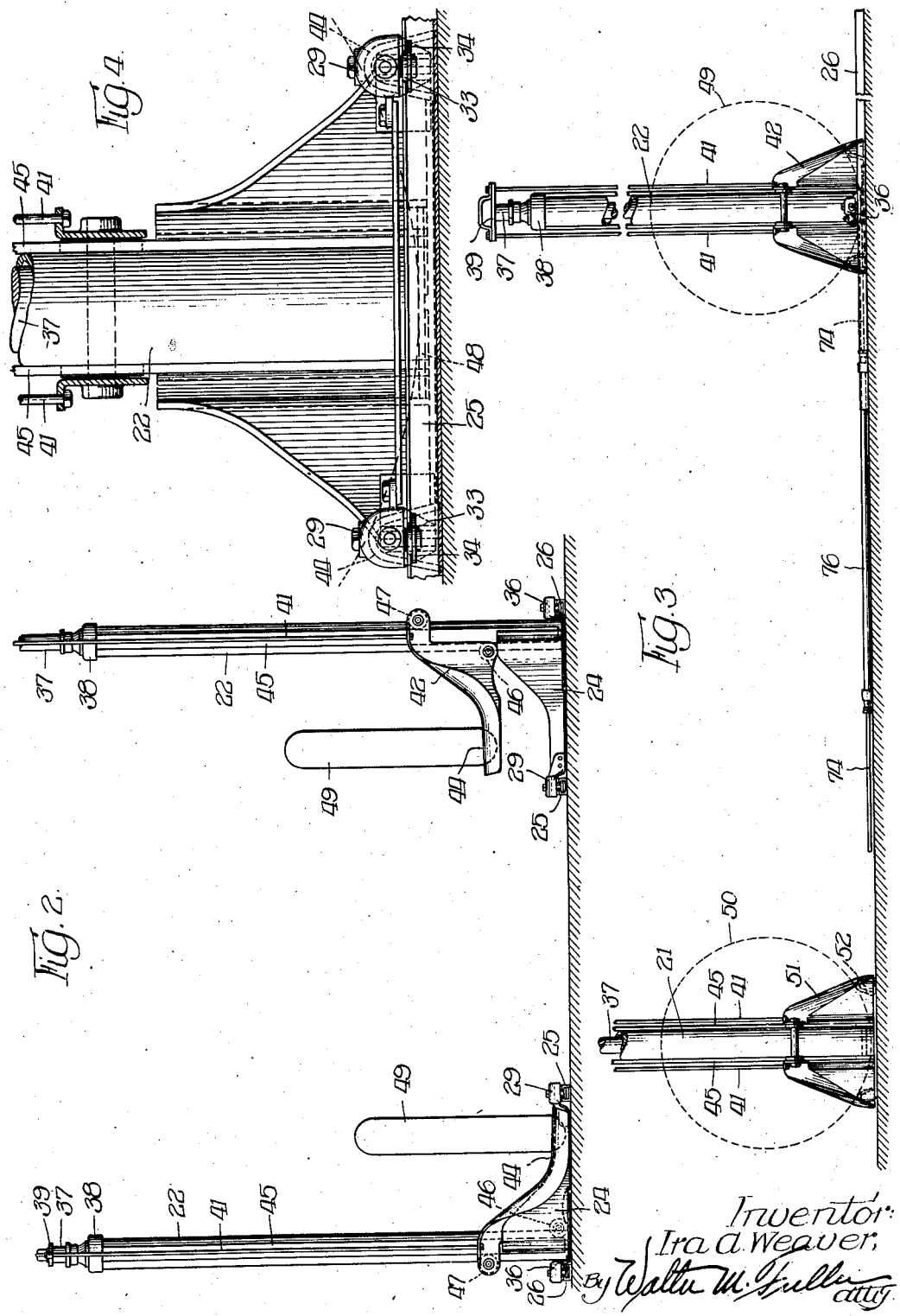

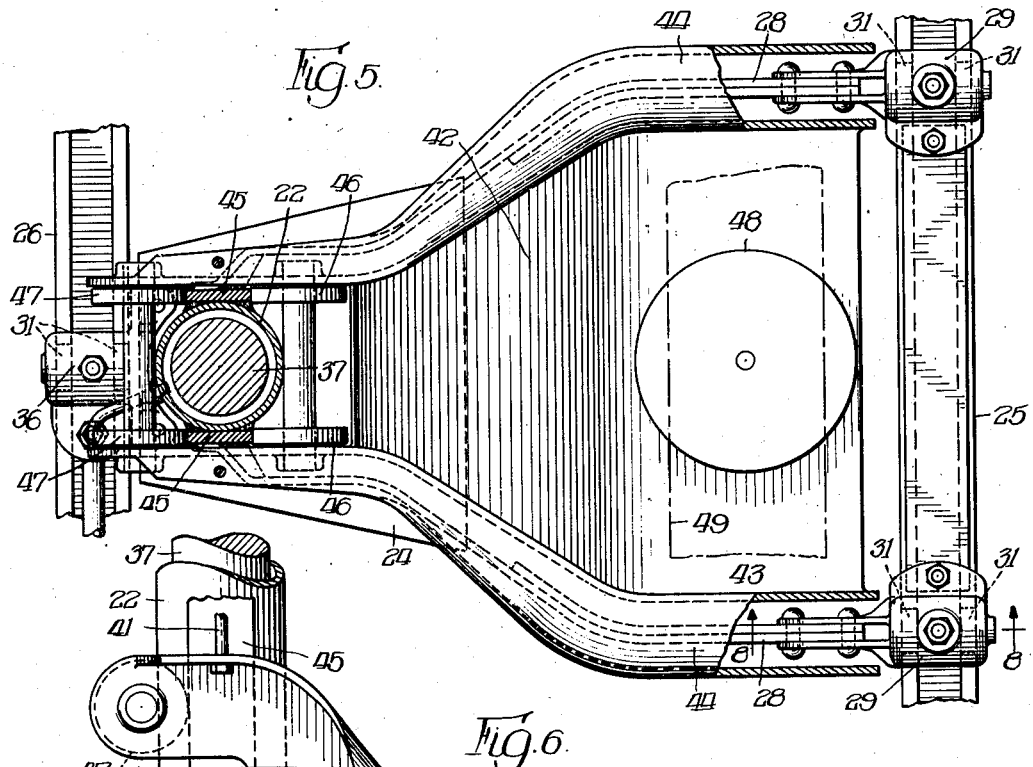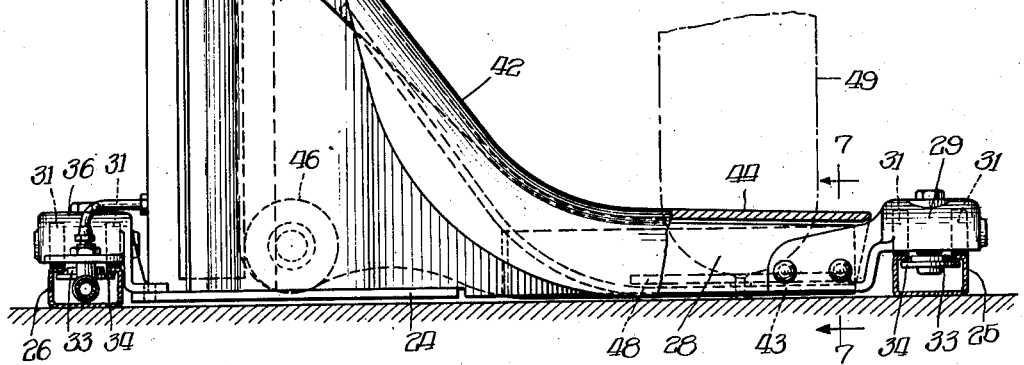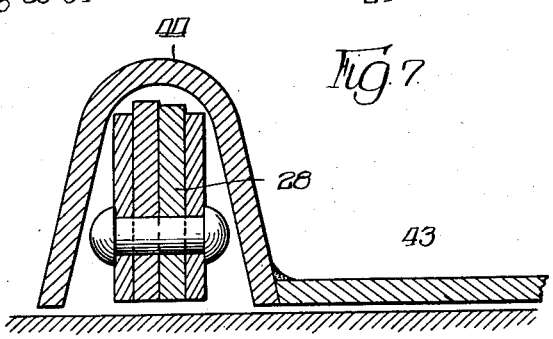

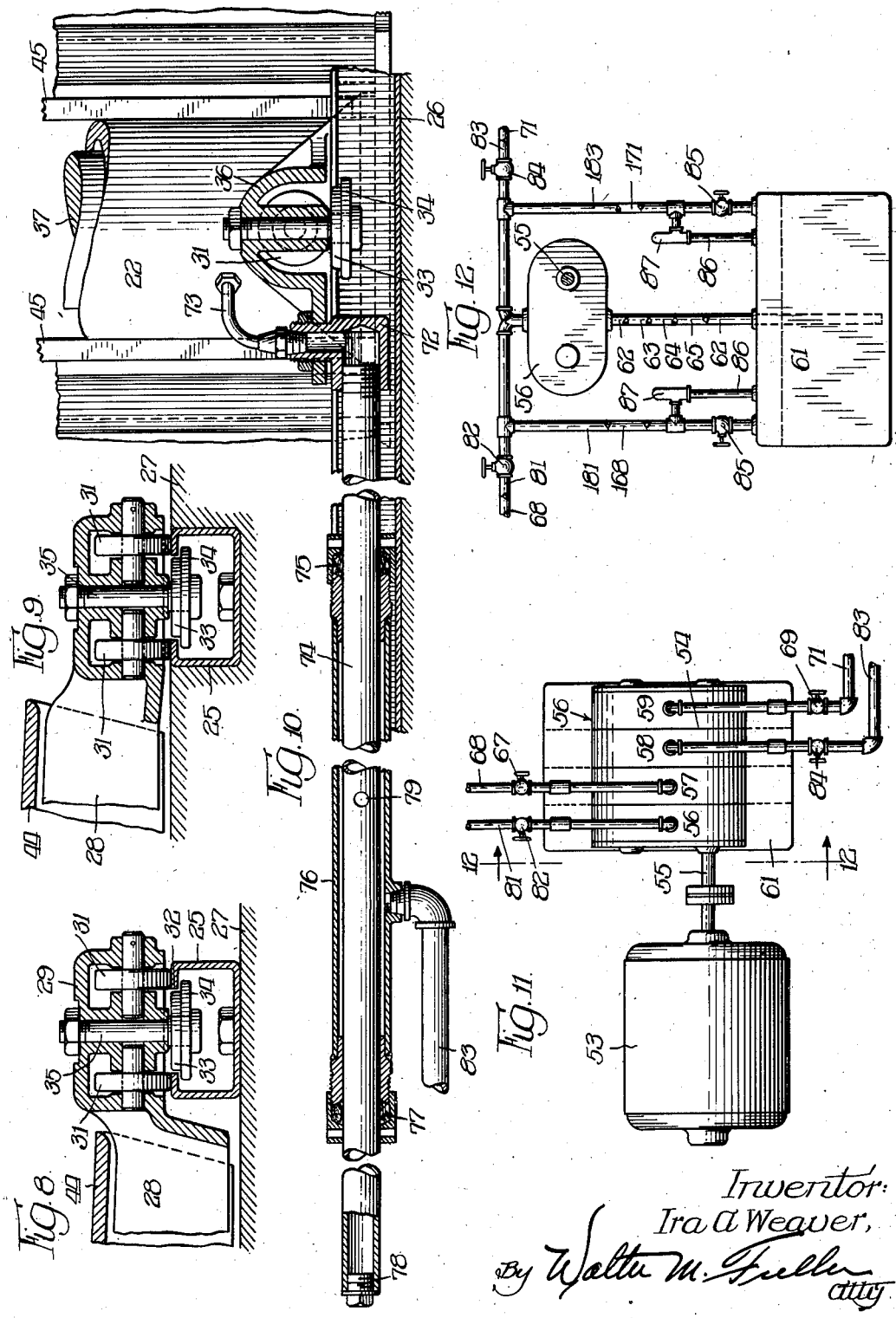

2,099,636

UNITED STATES PATENT OFFICE 2,099,636

VEHICLE-LIFT

Ira A. Weaver, Springfield, Ill., assignor to I. A. Weaver Engineering Company, Springfield, Ill., a corporation of Illinois Application December 9, 1935, Serial No. 53,531

9 Claims. (Cl. 254—93)

One of the leading aims of the present invention is to provide a vehicle-lift which has the advantage of affording free and unobstructed access to substantially all of the under parts of the elevated or raised vehicle, whereby to facilitate the making of repairs and adjustments, lubrication, etc., and, in one preferred embodiment of the invention, the automobile is elevated by the lifting means engaging its wheels, thus making the under portion of the vehicle, including the frames and axles, within easy reach.

The principles of construction of the appliance are such, however, that the invention is not necessarily limited to the raising of the automobile by engagement with its wheels, nor to lifting the car by elevating all four wheels at the same time.

While the apparatus permits raising of all of the wheels simultaneously and equally from the floor or ground, it is sometimes desirable to lift one end only of the car or to raise one side only, or more than the other end or side, and these results may be readily accomplished with the new type and style of lift or hoist.

An additional aim of the invention is to supply a vehicle-lift which may be relatively easily and inexpensively installed as compared with other kinds of appliances requiring pits or deep excavations as are ordinarily necessary for the hydraulic cylinder and plunger type of apparatus.

A further purpose of the invention is to furnish a device of the character specified having means permitting the rotation or turning of the front wheels of the car on their king-pin pivot-points, while the wheels are supported on the lift, whereby to give greater accessibility to the lubrication points of the vehicle and for service repair work.

A supplemental design of the invention is to make a vehicle-lift which is adjustable to the different wheel-base lengths of various automobiles and which also permits the apparatus to occupy the least possible space when not in use.

Further, another purpose of the invention is to provide a vehicle-lift of the type indicated which can be manufactured at relatively low cost and which will afford a great degree of safety by reason of its multiple and independent lifting members.

Other aims and objects of the invention will become apparent to those skilled in the art as the new construction and its mode of operation become known.

To enable those acquainted with this art to understand the invention both from structural and functional standpoints, a present preferred embodiment thereof, with one minor modification, has been illustrated in the accompanying drawings forming a part of this specification and to which reference should be had in connection with the following detailed description.

In these drawings:—

Figure 1 is a plan view of the new and improved vehicle-lift showing the four wheels of a vehicle thereon;

Figure 2 is an end elevation of the appliance showing one side of the vehicle partly raised;

Figure 3 is a side elevation of the apparatus with some parts broken away, the vehicle-wheels being indicated by dotted lines;

Figure 4 is an enlarged, fragmentary, detail view;

Figure 5 is a horizontal section through one of the wheel elevating means;

Figure 6 is a broken elevation of the portion of the structure presented in Figure 5;

Figure 7 is an enlarged, vertical section on line 7—7 of Figure 6;

Figure 8 is an enlarged, vertical section on line 8—8 of Figure 5;

Figure 9 is a similar view of a modified structure;

Figure 10 is an enlarged, detail, sectional view on line 10—10 of Figure 1;

Figure 11 illustrates the oil-pumping mechanism in plan;

Figure 12 is a section on line 12—12 of Figure 11;

Figure 13 is an end elevation of the novel lift showing an end portion of the raised vehicle supported on a supplemental or auxiliary truck or dolly; and Figure 14 is a side view of one of such dollies or trucks.

Referring to these drawings:—

The apparatus includes four upright cylinders 21, 21 and 22, 22, each secured in any appropriate manner to its base-plate 23 or 24, respectively, and at one end of the appliance the corresponding plates 23, 23 are secured fixedly to the floor, whereas, at the opposite end of the apparatus, which is designed to cooperate with the front wheels of the vehicle to be elevated, the other two plates 24, 24 are mounted adjustably on hollow rails or tracks 25, 26, 25, 26 through anti-friction bearings.

As is depicted in Figure 8, these hollow rails, such as the single one 25 presented in such illustration, may be mounted on the top of the floor 27, or may be embedded in the floor as shown in Figure 9 to be flush with the floor surface.

The stationary base-plates 23, 23 may be of any suitable shape, such as rectangular or square, but each of the movable plates 24, 24 has a pair of diverging arms 28, 28 (Figs. 5, 6, 7) mounted on and extended inwardly from it, each of such arms at its end remote from plate 24 carrying a hollow bracket 29 fitted internally with a pair of antifriction, vertically-arranged rollers 31, 31 (Fig. 8) adapted to bear and travel on the top surface of the hollow rail or track 25 on opposite sides of its longitudinal slot 32 in the top wall thereof.

In addition, each such bracket 29 has two horizontal, antifriction rollers 33, 34 mounted to rotate on an upright bolt or stud 35, the upper, smaller roller 33 occupying, and cooperating with the marginal walls of the slot 32, the companion, slightly-larger, lower roller 34 being of sufficient size to underlie the top wall of the rail or track on opposite sides of its slot, whereby these several rollers assist in supporting the base-plate 24 in a manner to permit its ready adjustment toward and from its companion or correlated base-plate 23 and the cylinder 21 of the latter.

The opposite part of each such base-plate 24 has another hollow bracket 36 (Fig. 6) mounted thereon and equipped with like rollers 31, 31, 33, 34 cooperating in similar manner with the parallel, companion, slotted track or rail 26.

Thus, each one of the two plates 24, 24 and the parts or members mounted thereon is readily adjustable to the desired position on these tracks with reference to the fixed plates 23, 23 and their cylinders.

Each upright or erect cylinder 22 (Fig. 3) accommodates a plunger 37 which projects up out through a stuffing-box in the cylinder-head 38, such plunger at its top end having a cross-head 39 connected by a pair of downwardly-extended bolts or rods 41, 41, located outside of the cylinder, to a saddle or cradle 42 shaped, as shown in the drawings, to surround the cylinder and having a flat, horizontal portion 43 (Figs. 5 and 6) with hollow ribs 44, 44 along its front and rear edge portions to fit over and shield the two arms 28, 28, secured to the base-plate, when the cradle or saddle is in its lowermost position.

The opposite portions of the exterior of each cylinder 22 (Figs. 5 and 6) have upright, guide plates or bars 45, 45 welded or otherwise secured to the cylinder, and the corresponding saddle 42 has four antifriction guide-rollers 46, 46 and 47, 47 co-acting with the opposite edges of such plates to guide the up and down travel of the saddle with a minimum of friction.

On its top surface, each flat plate-section 43 of each saddle or cradle 42 is equipped with a centrally-pivoted round-plate or turn-table 48 adapted to receive one of the front, dirigible ground-wheels 49, 49 of the automobile, thus permitting these two front wheels of the vehicle to be easily turned sidewise in either direction by means of their hand steering-wheel, whereby to afford better access to any portion of the vehicle requiring attention.

As is fully shown, the rear cylinders 21, 21 are in analogous manner equipped with plungers and saddles 51 (for the back vehicle-wheels 50, 50) similarly connected thereto and operated thereby, except that the saddles in this case have hollow, inwardly-directed, spaced-apart arms 52, 52 without any intervening plate-section corresponding to the part 43 of the front saddles, and, of course, they have no turn-tables.

As is clearly shown, the various hollow, spaced arms 52, 52 and ribs 44, 44 have top, curved surfaces over which the wheels of the automobile may be easily driven.

Considering now the hydraulic means for controlling and effecting the ascent and descent of the plungers and their saddles, the structure includes an electric-motor 53 (Figs. 1 and 11) which has the usual control means, not shown, for initiating, terminating, reversing and regulating its operation, such motor being connected to and driving a quadruple, gear oil-pump 54 comprising four separate pumps 56, 57, 58 and 59 mounted on the same shaft 55 and encased in their individual housings; all of these four pumps being located above an oil supply-tank or reservoir 61, preferably divided into four chambers, one for each pump.

Such four pumps have their individual, oil admission-pipes 62, 63, 64, and 65 connected to the interiors of their pump-casings with the lower ends of the pipes reaching nearly to the bottom of the interior of the corresponding chamber of the underlying reservoir 61, (Fig. 12) whereby, when the pumps are driven by the motor they suck the oil up their separate pipes.

Pump 57 is connected through a hand-operated valve 67 and a pipe 68 to the interior of one of the erect, stationary cylinders 21, pump 59 being similarly joined to the other cylinder 21 through another hand-valve 69 and a conduit 71.

Each sliding bracket or casting 36 (Fig. 10) carries an elbow 72 mounted thereon and located in part inside of the corresponding hollow track 26, the upper end of the elbow being connected through a tube 73 to the interior of the adjacent, upright cylinder 22.

A horizontal pipe or hollow plunger 74 at one end is secured in the elbow 72 so that the member 74 travels back and forth as the corresponding, erect cylinder is adjusted in position.

Such tubular element 74 extends through a stuffing-box 75 in one end of a stationary, elongated, horizontal cylinder 76 secured at one end in the terminal portion of the hollow track 26, the member 74 projecting through another stuffing-box 77 at the opposite end of part 74, the protruding end portion of element 74 being closed by a plug 78.

The intermediate or middle portion of the tubular member 74, which is always in the cylinder or casing 76, has one or more holes 79 through its wall, whereby the interior of the part 74 is at all times in communication with the interior of its enclosing casing 76.

The interior of one of such cylinders 76 is connected by a pipe 81 and its hand-valve 82 to the pump 56, and the other like casing or cylinder 76 is joined by a pipe 83 and its valve 84 to the pump 58, all as is clearly illustrated, so that the one pump is directly connected to the interior of one of the horizontally-adjustable, upright cylinders 22 and the other pump is similarly joined to the companion, movable cylinder 22, the telescoping or sliding association of the hollow plungers or tubes 74 with their cylinders 76 permitting the movements or adjustments of the cylinders 22 without breaking their hydraulic connections and without the use of any flexible hoses.

As is presented in Figure 12, each of the pipes 81, 68, 83, and 71, between its valve and pump is connected to the tank 61 by a pipe 181, 168, 183 and 171, as the case may be, each such pipe having a valve 85, each such valve being short-circuited by a pipe connection 86 having a safety-valve 87 set to open at a liquid pressure slightly greater than that required to operate the lift.

The appliance operates substantially as follows: The movable saddles 42, 42 and their associated parts having been manually adjusted as to position to conform to the wheel-base length of the vehicle to be elevated, the automobile is run onto the apparatus, its four wheels riding onto, and remaining on, the four saddles or cradles 42, 42, 51, 51, as clearly shown in Figure 1.

This result is easily accomplished because the upper surfaces of the spaced ribs or arms 44, 44, 52, 52 of the saddles are curved as shown so that the wheels may be readily driven over them, and when the front wheels of the vehicle are on these saddles they will be resting centrally on the two turn-tables 48, 48.

If all four plungers are to operate simultaneously and substantially equally to raise the vehicle in horizontal relation, all four valves 85, 85 are closed and the valves 82, 67, 84 and 69 are opened, whereby when the multiple-pump is operated by the electric-motor, the oil or other liquid pumped into the four, erect cylinders 21 and 22 will cause the equal and simultaneous ascent of their plungers 37, 37 and the like rise of the four saddles and the vehicle with them, all of the four wheels being supported by the saddles from below, the ascent, of course, being terminated by stopping the motor and pumps when the vehicle has reached the desired degree of elevation.

None of the saddles can be unduly elevated because its pump will have exhausted its oil supply when it reaches its maximum height.

While thus elevated, or before the lifting is instituted, the front wheels of the vehicle may be turned sidewise in either direction by the vehicle-steering mechanism to give better space for the repairs, lubrication or other work to be performed, the turntables rendering such turning of the wheels a matter of ease and convenience.

Owing to the fact that the spaced arms or ribs of the several saddles engage the wheels on opposite sides, forwardly and rearwardly, of their lowest points, there is no danger of the vehicle unintentionally rolling off of the lift either when it is in its lowermost position or when partially or fully raised.

It should be noted further that the tracks or rails 25 and 26 are on opposite sides of the planes of the front wheels, thus affording adequate support and avoiding undue or excessive strains on the lifting mechanism.

To lower the elevated vehicle, the operation of the electric-motor and pumps is reversed, permitting the plungers to descend into their cylinders, with a like lowering of the saddles and the vehicle which they support and, when the saddles reach their lowermost positions, the automobile may be run off of the apparatus in the usual way.

In case it is required or desired to raise the vehicle in any other manner than that indicated, since the pumps and their lifting means may be individually rendered inoperative while the one or more others are active, any tilting or inclination of the vehicle either forwardly or rearwardly or sidewise may be readily accomplished.

For example, assuming that it is desired to raise the front of the vehicle without elevating its rear portion, the operator will close valves 67 and 69 and open the valves 85 in the pipes 168 and 171 and then set the motor in action, in which case the two forward plungers of cylinders 22, 22 would raise the front of the vehicle, but inasmuch as the two pumps 57 and 59 are short-circuited, no liquid would be pumped to the two cylinders 21, 21.

In any analogous manner, any one or more of the pumps may be rendered inactive while the others are operative to elevate the vehicle in any desired manner.

If it is desired to support the vehicle from its frame rather than by its wheels so that its wheels may be more accessible and capable of turning on their axes, a truck-jack or a pair of such jacks or dollies 88 may be rolled under the elevated vehicle, as indicated in Figure 13, and its jacks raised to lift the automobile from the saddles by engagement with its axles, frame, or other parts, thus freeing the wheels from the saddles and permitting them to rotate on their axes. After the servicing of the car has been completed, the vehicle is again lowered onto the saddles and the truck or dollies removed.

It is preferable to use two such trucks or dollies, one for the front of the vehicle and the other for its rear portion, and, after the vehicle has been transferred in the indicated manner from the lifting appliance to such dollies, it may be easily rolled away for servicing elsewhere, thus freeing the vehicle lift for use with other automobiles, the vehicle being again rolled into proper position for transfer to the lift and lowering thereby when the work on the car has been completed.

The reason for using two dollies or small truck-jacks, instead of one larger one, for this purpose is that they occupy but relatively small space when not in service.

As has been indicated above, normally the rear vehicle-wheels are acted on by the non-adjustable lifts or saddles and the front wheels by the adjustable lifts or saddles, and, when a car is to be driven into position for engagement with the several saddles, the adjustable saddles may be first pushed rearwardly to their limit of travel, and if a car of longer wheel-base be driven into position, the front wheels will drop into the saddles of the adjustable supports and will push them forwardly until the rear wheels engage their relatively-stationary saddles.

An understanding of the construction and mode of operation of this appliance will indicate to those skilled in the art that the various objects of the invention have been attained in the structure described, but that the invention is not limited and restricted to the precise and exact details of construction since these may be modified within more or less radical limits without departure from the heart and essence of the invention as defined by the appended claims and without the loss or sacrifice of any of its material advantages.

I claim:

1. In a vehicle-lift, the combination of a pair of separate and independent lifting-and-lowering means outside of each of the opposite sides of the floor-space to be occupied by the vehicle to be elevated, the bottoms of said lifting-and-lowering means being at substantially floor-level, separate and independent means on each of said lifting-and-lowering means projecting inwardly toward and adapted to engage and to support and to lift and to lower the vehicle, means to operate said lifting-and-lowering means, said separate and independent means being at substantially floor-level in their lowest positions and adapted to have the vehicle-wheels driven onto them when in such lowest positions, and turn-tables on those ones of said inwardly-extended means designed to support the front wheels of the vehicle and on which such wheels are adapted to rest to permit easy side turning of such front wheels by their steering-mechanism.

2. In a vehicle-lift, the combination of a pair of upright cylinders outside of each of the opposite sides of the floor-space to be occupied by the vehicle to be elevated, plungers slidable in said cylinders, independent means extended from said plungers inwardly toward and adapted to engage and to support the vehicle and raised and lowered by said plungers, hydraulic means for said cylinders to force liquid thereinto to raise the vehicle and to permit its discharge therefrom to lower the vehicle, the bottoms of said cylinders being at substantially floor-level, said independent means being at substantially floor-level in their lowest positions and adapted to have the vehicle-wheels driven thereon while at such lowest positions, and turn-tables on those ones of said inwardly-extended means designed to support the front-wheels of the vehicle and on which such wheels are adapted to rest to permit easy side turning of such front-wheels by their steering-mechanism.

3. In a vehicle-lift, the combination of a pair of upright cylinders outside of each of the opposite sides of the floor-space to be occupied by the vehicle to be elevated, plungers slidable in said cylinders, independent means extended from said plungers inwardly toward and adapted to engage and to support the vehicle and raised and lowered by said plungers, and hydraulic means for said cylinders to force liquid thereinto to raise the vehicle and to permit its discharge therefrom to lower the vehicle, the bottoms of said cylinders being at substantially floor-level, said independent means being at substantially floor-level in their lowest positions and adapted to have the vehicle-wheels driven thereon while at such lowest positions, said vehicle-engaging means comprising saddles adapted to engage and support the vehicle-wheels and constructed to prevent the wheels from unintentionally rolling off thereof either forwardly or rearwardly.

4. In a vehicle-lift, the combination of a pair of upright cylinders outside of each of the opposite sides of the floor-space to be occupied by the vehicle to be elevated, plungers slidable in said cylinders, independent means extended from said plungers inwardly toward and adapted to engage and to support the vehicle and raised and lowered by said plungers, hydraulic means for said cylinders to force liquid thereinto to raise the vehicle and to permit its discharge therefrom to lower the vehicle, the bottoms of said cylinders being at substantially floor-level, said independent means being at substantially floor-level in their lowest positions and adapted to have the vehicle-wheels driven thereon while at such lowest positions, tracks at one end of the vehicle located both inside and outside of the corresponding faces of each of the correlated vehicle-wheels, and carriages mounted to travel on said tracks and on which the corresponding cylinders and plungers are mounted, whereby to permit adjustment of the lift to vehicles of different wheel-base lengths.

5. In a vehicle-lift, the combination of a pair of separate and independent lifting-and-lowering means outside of each of the opposite sides of the floor-space to be occupied by the vehicle to be elevated, the bottoms of said lifting-and-lowering means being at substantially floor-level, separate and independent means on each of said lifting-and-lowering means projecting inwardly toward and adapted to engage and to support and to lift and to lower the vehicle, means to operate said lifting-and-lowering means, said separate and independent means being at substantially floor-level in their lowest positions, and adapted to have the vehicle-wheels driven on to them when in such lowest positions, wheeled-truck-jack means of a size to be rolled beneath the lifted vehicle and to elevate such raised vehicle from the lift and to support the same, whereby the elevated vehicle may be conveyed away from the lift on said jack means.

6. In a vehicle-lift, the combination of a pair of separate and independent lifting-and-lowering means outside of each of the opposite sides of the floor-space to be occupied by the vehicle to be elevated, the bottoms of said lifting-and-lowering means being at substantially floor-level, separate and independent means on each of said lifting-and-lowering means projecting inwardly toward and adapted to engage and to support and to lift and to lower the vehicle, means to operate said lifting-and-lowering means, said separate and independent means being at substantially floor-level in their lowest positions and adapted to have the vehicle-wheels driven on to them when in such lowest positions, a pair of wheeled-truck-jacks of a size to be positioned beneath the elevated vehicle and adapted respectively to engage its front and rear portions and to elevate the raised vehicle from the lift and to support the same, whereby the elevated vehicle may be conveyed away from the lift on said jacks.

7. In a vehicle-lift, the combination of a pair of separate and independent lifting-and-lowering means outside of each of the opposite sides of the floor-space to be occupied by the vehicle to be elevated, the bottoms of said lifting-and-lowering means being at substantially floor-level, separate and independent means on each of said lifting-and-lowering means projecting inwardly toward and adapted to engage and to support and to lift and to lower the vehicle, and means to operate said lifting-and-lowering means, said separate and independent vehicle-supporting means being at substantially floor-level in their lowest positions and adapted to have the vehicle-wheels driven on to them when in such lowest positions, corresponding ones of each of said pair of lifting-and-lowering means and their associated vehicle-supporting means being adjustable toward and from the remaining ones of said pairs, whereby when the vehicle-wheels have ridden onto said adjustable vehicle-supporting means, such wheels shift said supporting means along with them until the remaining vehicle-wheels ride on to their corresponding relatively-stationary vehicle-supporting means, thus effecting an automatic adjustment of wheel-base length of the lift to conform to that of the vehicle to be raised and lowered.

8. The vehicle-lift set forth in claim 7 in which said operating-means may actuate said lifting-and-lowering means simultaneously or any one or more independently of the other or others.

9. In a vehicle-lift, the combination of a pair of separate and independent lifting-and-lowering means outside of each of the opposite sides of the floor-space to be occupied by the vehicle to be elevated, the bottoms of said lifting-and-lowering means being at substantially floor-level, separate and independent means on each of said lifting-and-lowering means projecting inwardly toward and adapted to engage and to support and to lift and to lower the vehicle, and means to operate said lifting-and-lowering means, said separate and independent vehicle-supporting means being at substantially floor-level in their lowest positions and adapted to have the vehicle-wheels driven on to them when in such lowest positions, corresponding ones of each of said pair of lifting-and-lowering means and their associated vehicle-supporting means being adjustable independently of one another toward and from the remaining ones of said pairs, whereby when the vehicle-wheels have been driven on to said adjustable supporting-means, the weight of either wheel on such adjustable supporting-means may be removed by any appropriate means and the supporting-means moved along out of the way to allow such wheel to be removed from the vehicle.

IRA A. WEAVER.